March 28, 1967 H. MORI 3,311,915
MICROWAVE IDENTIFICATION SYSTEMS
Filed Oct. 20, 1965 3 Sheets-Sheet 1
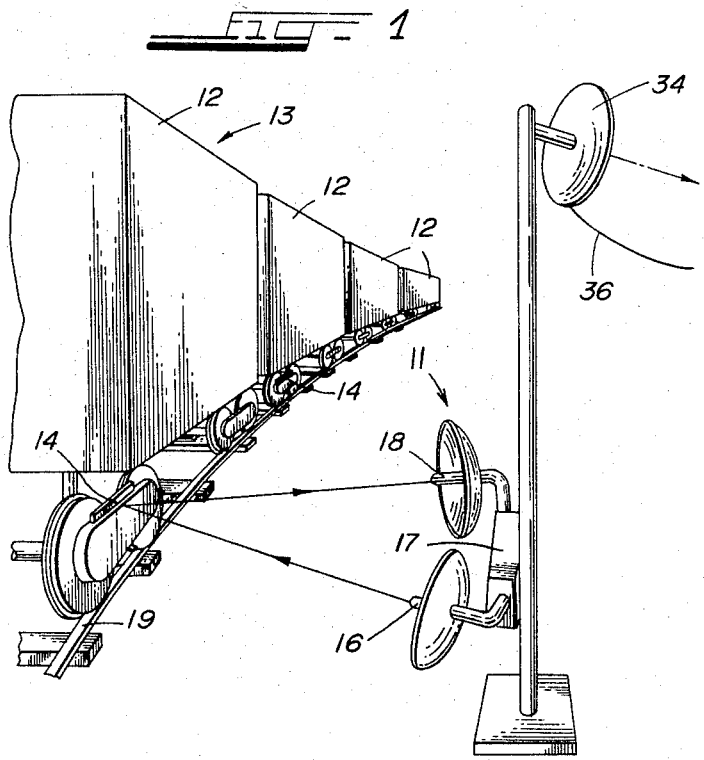
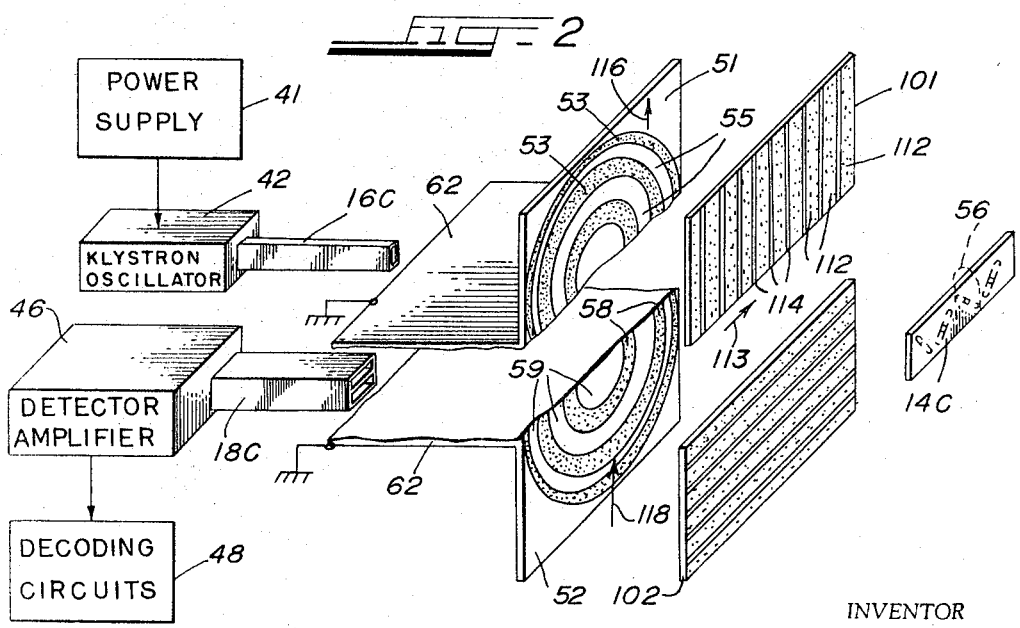
INVENTOR
HIDEO MORI
BY
Wallace, Kinzer & Dorn
ATTYS

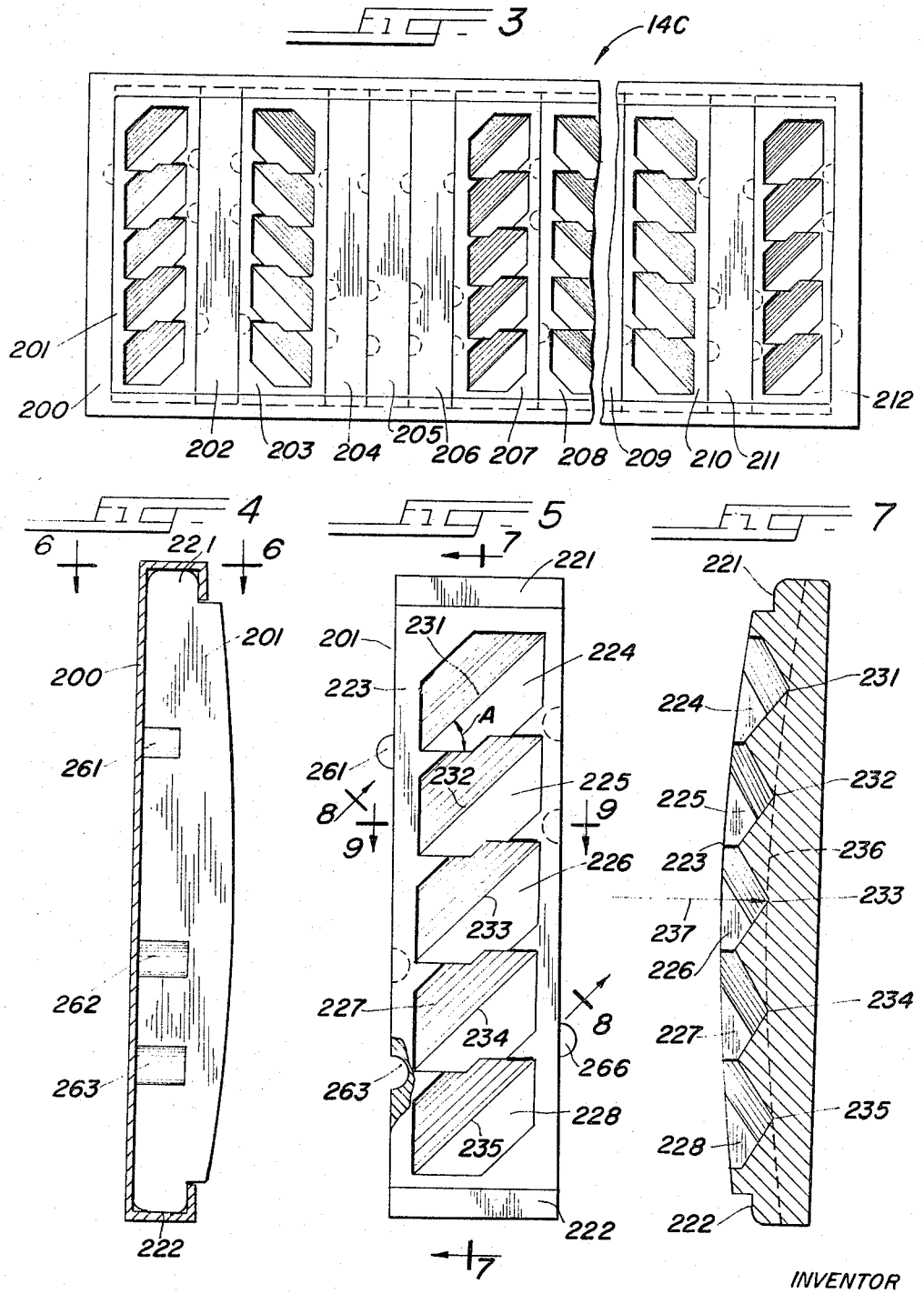

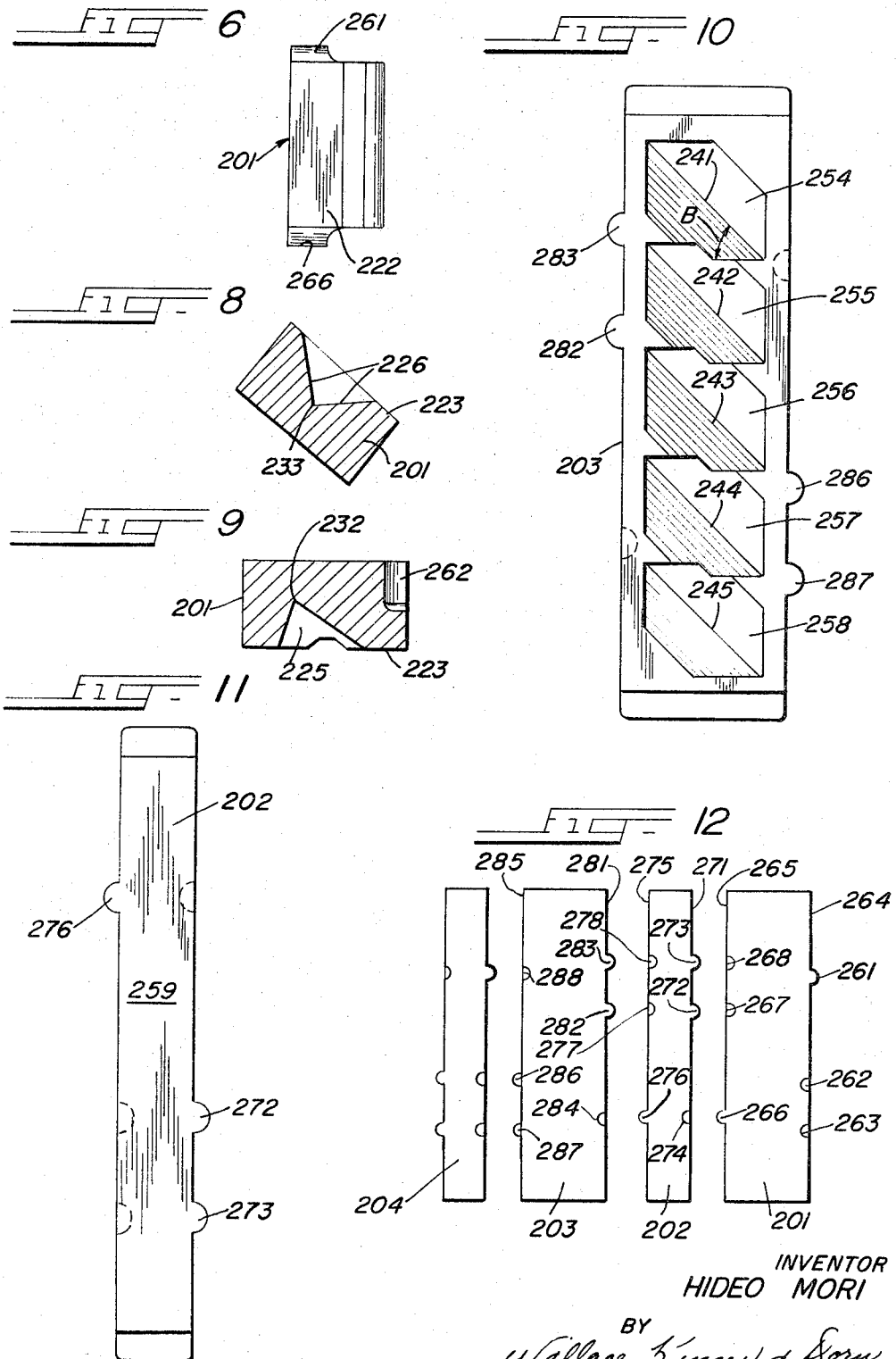

3,311,915
MICROWAVE IDENTIFICATION SYSTEMS
Hideo Mori, Woodland Hills, Calif., assignor to Abex Corporation, a corporation of Delaware
Filed Oct. 20, 1965, Ser. No. 498,795
5 Claims. (Cl. 343—18)

This invention relates to a new and improved system for automatic identification of objects, including identification of railroad cars and locomotives and like vehicles. More particularly, the invention relates to an improved identification member construction for use in an automatic, all-weather radiant signal identification system for railroad cars and other large objects.

It is critically important for railroad management to know, at all times, the locations of the locomotives and cars of a railroad system. If a car is loaded, identification of its location enables the railroad to keep the shipper and receiver posted as to progress of the car. If a car is empty, information as to its location is essential to enable use of the car when it is needed. Moreover, because both locomotives and cars require periodic service, continuing information regarding their location is important to proper servicing. The same and similar considerations apply to identification of trucks, automobiles, and other vehicles and large objects in varying fields of activity.

A number of different systems have been proposed to provide for automation of the reporting and recording of railroad car and locomotive location information. One particularly advantageous system is described in detail in the co-pending application of Omer F. Hamann and Sherman H. Boyd, Ser. No. 319,914 filed Oct. 4, 1963, now Patent No. 3,247,509. In that system, each railroad car and locomotive is provided with a relatively small coded microwave reflector identification member, each coded identification member including a plurality of individual microwave reflector elements. The system further includes a roadside scanning station comprising a source of microwave signals and a microwave transmitter antenna that is coupled to the signal source. The microwave signals are radiated from the transmitter antenna and are reflected back from each coded identification member traversing the scanning station to impinge upon a receiver antenna. The coded information represented by the reflected microwave signals is subsequently detected and processed to identify the individual railway vehicles passing through the scanning station.

In the aforementioned Hamann and Boyd microwave vehicle identification system, the code signals from the identification members are changed in polarization from the original radiated signals from the microwave transmitter antenna. Thus, that system employs rotation in two different directions, from the orignal polarization, in order to distinguish binary "ones" from binary "zeros." But rotation in polarization of the reflected signal is also advantageous in distinguishing that signal from the originally transmitted signal, substantially eliminating the effect of cross-talk from the transmitting antenna to the receiving antenna. Even in a system in which synchronous detection is employed, such as that disclosed and claimed in the co-pending application of William R. Bradford, Steven Molnar and Bruce H. Siperly, Ser. No. 313,886, filed Oct. 4, 1963, now Patent No. 3,247,508, in which only one binary quantity is actually represented by reflected signal pulses from the identification member, it is still advantageous to provide for a change in polarization of the signal reflection from the identification member. A particularly advantageous form of coded target structure, utilizing corner reflectors as the individual code elements, is described and claimed in the co-pending application of Steven M. Molnar and Bruce H. Siperly, Ser. No. 313,887, filed Oct. 4, 1963, now Patent No. 3,247,510.

The corner reflector code elements of the Molnar et al. Patent No. 3,247,510 afford relatively high efficiency coupled with accurate rotation of the direction of polarization through an angle of 90°. However, obtaining adequate signal-noise ratios, even with the advantages offered by corner reflectors, is sometimes relatively difficult, particularly where the objects to be identified are railroad cars or other vehicles subject to the wear and tear of an adverse environment and subject to some displacement relative to optimum scanning position. Thus, it has proved desirable to incorporate more than one corner reflector on each code element in order to obtain, in all instances, a reflected signal of sufficient amplitude to assure reproduction to the full code information identifying each railroad car or like object. By utilizing more than one corner reflector for each code element, the effective radar cross-section of the target is increased with respect to each code element, improving the reflection characteristics and compensating for displacement of the identification member from optimum position.

The utilization of multiple corner reflector, however, presents some critical problems. If two corner reflectors are employed, and if the path lengths from the two corner reflectors to the scanning apparatus differ by a total of one-half wavelength at the operating frequency of the system, the signals reflected by the two corner reflectors as received at the receiving antenna are 180° out of phase and hence tend to cancel each other. That is, with a one-half wavelength difference in path length, a null corresponding to a blank code element is detected by the receiving antenna instead of the intended high amplitude reflected signal. A difference in effective path length of this magnitude, between adjacent corner reflectors, may occur if the identification member is displaced in a direction normal to the radiation path from the scanning equipment to the identification member, or if the identification member is rotated about an axis parallel to the direction of its movement. As a consequence, multiple corner reflector identification elements tend to be sensitive both to angular and to vertical displacement.

The corner reflector code elements discussed above can be arranged to afford a mode of operation similar to monopulse operation, referred to in the aforementioned Patent No. 3,247,510 as "pseudo-monopulse" operation. But this highly desirable operational effect can be achieved only if the corner reflectors of adjacent code elements have their apexial axis oriented at angles of approximately 90° relative to each other. Consistent orientation of the many code elements required for each identification member may be missed where the code elements can be mounted with adjacent code elements having their corner reflector apex axes parallel, especially when there are intervening blank code elements.

Even with small retro-reflective code elements, such as the preferred corner reflector code elements, the total length of the identification member remains something of a problem. This is particularly true if it is desired to make a parity check or similar check of accuracy in the identification process. Thus, it is highly desirable to find some means to reduce the overall length of the identification member while at the same time making adequate provision for a parity check or other such check of accuracy.

It is a principal object of the present invention, therefore, to provide a new and improved coded identification member, for use in an automatic object identifying system, that effectively and inherently eliminates or minimizes the problems and difficulties enumerated above.

A specific object of the invention is to afford a multiple-reflector code element for a coded identification member employed in a microwave or other radiant energy system that does not adversely affect operation of the system as the result of rotational or translational displacement of the identification member in relation to an optimum reflection position.

Another object of the invention is to increase the efficiency of an automatic object identifying system, based upon the reflection of microwave or other radiant signals, by increasing the efficiency of reflection of coded identification members employed in the system without increasing the overall size of the identification members. A related object of the invention is to provide for improved accuracy checking in an automatic object identification system using microwave energy or similar radiant energy reflected from coded identification members, and at the same time reduce the size of the identification members, by establishing a preferred relationship between the dimensions of reflecting and non-reflecting code elements.

A further object of the invention is to assure achievement of "pseudo-monopulse" operation, in an automatic object identifying system based upon the reflection of microwave signals or like radiant energy signals from coded reflected identification members, by constructing individual code elements for the identification members in a manner such that they can only be assembled in a particular desired relationship to each other.

An additional object of the invention is to provide a new and improved coded identification member for an automatic object identification system which is relatively simple and inexpensive to produce yet rugged enough for use in applications presenting the most adverse kind of environment.

Accordingly, the invention is directed to a coded identification member for use in an automatic object identifying system in which individual large objects such as railroad cars are identified at a scanning station including a source of radiant energy signals, means for radiating those signals along a given reference path and polarized in a given initial direction, and receiving means for receiving radiant energy signals reflected back to the scanning station, the receiving means being limited to signals polarized in a second and substantially different direction. The identification member of the present invention comprises an elongated base adapted to be mounted on one of the objects to be identified and a plurality of code elements disposed at predetermined code positions along that base. The code elements comprise at least two distinct types as follows:

Type A—code elements having a plurality of aligned similar corner reflectors having their apexial axes at an angle of 45° clockwise relative to the aforesaid initial direction of polarization and with their apexial axes located on a convex cylindrical surface approximately tangential to a plane normal to the reference radiation path, and Type B—code elements substantially identical to the elements of type A except that the apexial axes of their corner reflectors are at an angle of 45° counterclockwise relative to the initial direction of polarization. In the preferred construction, the code elements also comprise a further type C, having a smooth surface that does not include corner reflectors, and this additional type of code element is preferably constructed with a width that is a small integral fraction of the width of the code elements of types A and B.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 is a partially schematic perspective view of a scanning station for an automatic object identifying system of the kind in which the present invention is employed;

FIG. 2 is a partially schematic, partially exploded perspective view of one form of focusing lens system that may be employed in the identification apparatus of FIG. 1;

FIG. 3 is a front elevation view of a fully assembled coded identification member constructed in accordance with a preferred embodiment of the present invention;

FIG. 4 is a sectional view taken approximately along line 4—4 in FIG. 3 and showing a single code element of the identification member in side elevation;

FIG. 5 is a front elevation view of the single code element of FIG. 4;

FIG. 6 is an end elevation view of the code element of FIG. 4;

FIG. 7 is a sectional elevational view taken approximately along line 7—7 in FIG. 5;

FIG. 8 is a detail sectional view taken approximately along line 8—8 in FIG. 5;

FIG. 9 is a detail sectional view taken approximately along line 9—9 in FIG. 5;

FIG. 10 is a front elevation view, similar to FIG. 5, of a second type of code element incorporated in the assembly of FIG. 3;

FIG. 11 is a front elevation view of a third type of code element incorporated in the assembly of FIG. 3; and FIG. 12 is a rear elevational view of several of the code elements of the assembled identification member of FIG. 3, separated from each other to illustrate their interlocking relationship.

FIG. 1 illustrates an automatic railway car identifying apparatus 11 constructed in accordance with the system disclosed in the above-identified Patent No. 3,247,509 of Omer F. Hamann and Sherman H. Boyd and generally illustrative of the kind of automatic identification apparatus in which the present invention may be employed. The apparatus 11 constitutes a trackside scanning station and may be a part of a system including two or more essentially similar stations. The identification apparatus 11 includes a transmitting antenna 16 and a receiving antenna 18 both connected to a circuit unit 17. The circuit unit 17 may be coupled to a centralized data processing station (not shown) by suitable means such as a transmission link comprising an antenna 34 or by a conductive line 36.

A train 13 moving past the identification apparatus 11 at the scanning station moves each individual car 12 along a given path, determined by the track 19, past the antennas 16 and 18. Each car 12 carries an elongated identification member 14. Each identification member 14 is provided with a plurality of individual code reflector elements that are arranged in accordance with a predetermined code pattern as described more fully hereinafter. The identification members are mounted on the respective railroad cars 12 or like vehicles at a suitable location coinciding with the common focus of the two antennas 16 and 18. One suitable location for the identification plates 14, on the railway cars 12, is on the wheel carriages or trucks immediately above the springs, this location being substantially standardized with respect to height above the railway track 19.

Other and different mounting arrangements may be employed, so long as the identification plates traverse the required path coincident with the common focus of the antennas 16 and 18. The location of the identification members 14 lengthwise of the cars 12 is not critical; either truck on any given car may be selected for mounting the identification member, or the plates may be mounted at the mid-points of the cars. Preferably, there are two plates 14 for each car, one identification plate on each side of the car, so that it is not necessary to duplicate the identification apparatus 11 on the opposite side of the track 19.

In operation, a microwave signal from the circuit unit 17 is supplied to the transmitting antenna 16 and is radiated toward a scanning position traversed by the identification members 14. The polarization of the radiated signal is controlled so that virtually all of the radiation is limited to a given initial polarization. The radiated signal is intercepted and reflected, by the individual code reflector elements of each identification member 14, back to the receiving antenna 18. Preferably, the reflected signals are changed in polarization through an angle of approximately 90° to enable the receiving antenna 18 to distinguish the reflected signals from the initially radiated signals from transmitting antenna 16.

Reflected signals impinging upon the antenna 18 are detected to produce a pulse signal representative of the position code of the individual reflector elements along the length of the identification member 14. This pulse signal is supplied, from the circuit unit 17, to suitable storage and data processing apparatus to identify each of the railroad cars 12 moving through the scanning station at which the apparatus 11 is located.

FIG. 2 illustrates a lens system constructed in accordance with one embodiment of the invention disclosed in the aforementioned Bradford et al. Patent No. 3,247,508. This lens system is utilized in conjunction with a transmitting apparatus that is essentially similar to that described above in connection with FIG. 2. The signal source for the system comprises a klystron oscillator 42 energized from a suitable power supply 41. The klystron oscillator is connected to a transmitting wave guide 16C that, in this instance, radiates a horizontally polarized microwave signal. The outlet of the radiating wave guide 16C is located immediately above a grounded conductive septum 62 that extends from the wave guide to a microwave zone plate lens 51. The radiating source represented by the right-hand end of the wave guide 16C is located approximately at one focus of the lens 51. The outer focus of the lens is coincident with a path along which the vehicle identification members 14C are moved.

The receiving portion of the lens system in substantially similar to the transmitting portion. A second zone plate lens 52 is provided for focusing the reflected signals from the identification member 14C back to the end of a receiving wave guide 18C, located immediately below the left-hand edge of the septum 62. Preferably, the wave guide 18C is provided with a horizontally extending internal septum to reduce effective reception of horizontally polarized signals. The receiving wave guide 18C is connected to a suitable detector and amplifier circuit 46 in turn connected to de-coding circuits 48.

The lens system of FIG. 2 also includes a first polarization grid 101 interposed between the transmitting lens 51 and the identification member 14C being scanned. A similar polarization grid 102 is interposed between the identification member and the second or receiving antenna 18C. In the illustrated arrangement, the second polarization grid 102 is located between the identification member 14C and the lens 52, although it could be disposed on the opposite side of the lens. The structures of the zone plate lenses 51, 52 and of the polarization grids 101 and 102 are fully described in the aforementioned Bradford et al. Patent No. 3,247,508.

In operation, a microwave signal developed by the klystron oscillator 42 is radiated by the transmitter antenna wave guide 16C, and is focused upon the identification member 14C by the lens 51. The signal as originally radiated from the antenna 16 is horizontally polarized. As the signal is transmitted through the lens 51, some vertically polarized components are introduced, particularly along those parts of the lens extending at angles of 45° from the lens axis.

The horizontally polarized components of the radiated signal are transmitted without substantial attenuation through the polarization grid 101 to afford the desired horizontally polarized signal 113 impinging upon the identification member 14C. To the vertically polarized components passed by the lens 51 (see arrow 116) the grid 101 represents an effective short circuit. That is, to these signals the grid 101 appears as a wave guide operating beyond cutoff.

The microwave signal impinging upon the identification member 14C, as generaly indicated by the focal outline 56 in FIG. 2, excites an individual reflector element on the identificaton member whenever that element is well located within the focus. As a result, the signal is reflected and re-radiated, but with a change in polarization through an angle of plus or minus 90°, depending upon the orientation of the reflector. Thus, the reflected signal impinging upon the second polarization grid 102 is vertically oriented. However, there are other stray reflections with a horizontal polarization, particularly if the identification member 14C is made of a conductive material.

The second polarization grid 102 is essentially identical in construction to the grid 101 except that it is oriented at an angle of 90° relative to the first grid. Thus, the polarization grid 102 passes vertically polarized signals without substantial attenuation. But horizontally polarized signals are effectively shorted out by the grid structure 102 and are not passed on to the lens 52. Accordingly, the signal reaching the second or receiving lens 52 is effectively limited to a vertically polarized signal as indicated by the arrow 113. This signal is focused, by the lens 52, upon the receiving antenna wave guide 18C.

In FIG. 2, the polarization grids 101 and 102 have been displaced from the lenses 51 and 52 for clarity of illustration. In actual practice, the polarization grids are mounted quite close to the lenses. Indeed, the preferred arrangement is to mount the polarization grids directly on the surface of the two Fresnel lenses. The same dielectric sheet that is employed as a part of each of the two lenses 51, 52 may also be utilized as the support member for the polarization grids 101, 102, since the raised or conductive bands affording the lens action are disposed on the surface of the lens dielectric facing the two antennas. This makes it possible to apply the conductive elements 112 affording the polarization grid on that surface of the same lens dielectric that faces the identification member 14C.

FIG. 3 illustrates a coded identification member 14C constructed in accordance with the present invention, FIGS. 4 through 12, illustrating the individual code elements that are incorporated in the identification member. Identification member 14C comprises an elongated base constituting a frame 200 that is adapted to be mounted on one of the objects to be identified, such as one of the cars 12 in the train 13 (FIG. 1). The frame or base 200 holds a plurality of individual code elements 201–212 in aligned relationship to each other.

In a practical identification member structure, as used in a freight car identification system, there may be as many as fifty or more of the individual code elements 201–212; in one system the total requirement is for fifty-two individual code elements. The precise number required is determined by system requirements and not by the structural features of the code elements themselves, since each code element represents one digit in an identification code. The complete grouping of code elements can be formed as a single, integrated casting, but physically distinct code elements are preferred, as described hereinafter.

The code elements 201–212 are of three distinct types. Of the code elements shown in the assembly illustrated in FIG. 3, elements 201, 207 and 212 are of a first type representative of a binary "one" and referred to hereinafter as type A. Code elements 203, 208, and 210 are of a second type, referred to hereinafter as type B, that is also representative of a binary "one" but that is somewhat different structurally from the type A code elements. The third type of code element, sometimes referred to hereinafter as type C, is a blank code element representative of a binary "zero." In the assembly 14C of FIG. 3, code elements 202, 204, 205, 206, 209 and 211 are of type C.

FIGS. 4 through 9 all constitute detail views of a single type A code element as exemplified by code element 201. As shown in those figures, the opposite ends of code element 201 are provided with projecting flanges 221 and 222 that are engaged by the frame 200 to mount the code elements in the assembled identification member. The front face 223 of the code element is not flat. Rather, it constitutes a convex surface, preferably on a circular arc. In the surface 223, a plurality of individual corner reflector depressions 224, 225, 226, 227 and 228 are formed. Assuming that the originating signal with which the code elements are employed is polarized in a horizontal direction, as assumed in connection with the description of FIG. 2, the apexial axes of the individual corner reflectors are each oriented at an angle of 45° to the horizontal. Thus, the individual apex axes 231, 232, 233, 234 and 235 of the corner reflectors 224, 225, 226, 227 and 228, respectively, are each oriented at an angle of 45° to the initial direction of polarization of the identification system, in this instance a horizontal polarization.

The corner reflectors 224–228 are essentially similar in construction to each other and are of equal depth so that the apexial axes 231–235 are located upon a convex surface shown in FIG. 7 by the phantom line 236 and corresponding in curvature to the front surface 223 of the code element. When the identification member is mounted upon an object to be identified, the mounting arrangement should be such that the convex surface 236 including the individual corner reflector axis 231–235 is disposed approximately tangential to a plane normal to the reference path of the interrogating signal, generally indicated in FIG. 7 by the phantom line 237.

As noted above, reflections of the interrogating microwave signal from the corner reflectors of code element 201 tend to cancel each other if the total incident and reflected path length for one of the corner reflectors varies from the total path to an adjacent corner reflector by one-half wavelength at the operating frequency of the system. This reflection de-phasing effect, which can prevent effective operation of the identification system, is avoided in code element 201 by two distinctive features of the construction adopted. In the first place, the individual corner reflectors are disposed as close together as possible while retaining their individual identities and effective polarization rotation characteristics. More importantly, however, the alignment of the corner reflectors with their apexial axis on a convex surface (surface 236) avoids signal cancellation through variations in the signal paths to the individual corner reflectors. Thus, if the incident signal is accurately focused down to the size of a single corner reflector and impinges upon code element 201 from a direction exactly normal to the apexial axis 233 of corner reflector 226 as shown in FIG. 7, most of the reflected signal energy reaching the receiving antenna is that reflected by corner reflector 226 and there is little or no possibility of cancellation from signals reflected by the remaining corner reflectors of the code element.

These ideal conditions are usually not capable of realization. Thus, the incident signal 237 may impinge from a direction that is angularly displaced, to a limited extent, from that illustrated in FIG. 7, and may impinge equally upon two or more of the corner reflectors. If the incident signal is generally centered on the code element, as shown in FIG. 7, the signals reflected from the two end corner reflectors 224 and 228 are reflected at such angles that they are not focused on the receiving antenna and do not produce signals of substantial amplitude in the receiver. The central corner reflectors 225 and 227, on the other hand, are so close to the center corner reflector 226 that their reflected signals are not displaced 180° in phase with respect to the signal reflected by reflector 226 and add to the received signal strength rather than subtracting from it.

The same effect is realized if the code element 201 happens to be rotated either in a clockwise direction or a counterclockwise direction from the precise alignment illustrated in FIG. 7. That is, immediately adjacent corner reflectors reflect signals that are substantially in phase with each other and tend to add. More remote corner reflectors produce reflection signals that are directed away from the receiving antenna, due to the curvature of the code element, and hence do not detract from the effective operation of the system. Thus, by packing the corner reflectors as closely together as possible, and more importantly by locating the apexial axis of the corner reflectors on a convex surface that in effect constitutes a discrete section of a convex cylindrical mirror, the difficulties attendant upon the use of multiple corner reflectors in a single code element are substantially eliminated. Stated differently, the arrangement of the corner reflectors on a convex surface as described above makes it possible to construct a code element in which path lengths that differ by one-half wavelength are non-retro-reflective with respect to the receiving apparatus so that the amount of de-phased signal energy returned to the receiving apparatus is orders of magnitude smaller than the reflected in-phase signals from corner reflectors centered in the path of the incident signal. In practical operation, the reflected signal is effectively taken from two, or at most three, of the corner reflectors on the code element.

The other type of code element employed for binary ones, type B, as represented by code elements 203, 208 and 210, is substantially identical to the type A code elements as represented by code element 201 except for mounting arrangements (discussed in detail hereinafter) and the alignment of the corner reflector axes with respect to the incident polarized signal. Thus, the apexial axes 231–235 of code element 201 are oriented at an angle A of 45° counterclockwise relative to the horizontal, assumed to be the direction of initial polarization for the identification system. The individual apexial axes 241–245 of the corner reflectors 254–258 of code element 203, on the other hand, are each oriented at an angle B of 45° clockwise relative to the horizontal, the initial direction of polarization. In all other respects, the corner reflectors 251–258 correspond fully to the corner reflectors 224–228 (see FIGS. 10 and 5). Again, in order to avoid phase cancellation in the reflected signals, the apexial axes of the corner reflectors are located upon a convex surface as described in connection with FIG. 7. In fact, FIG. 7 may be taken as a cross-section of either code element 201 of FIG. 5 or of code element 203 of FIG. 10.

The third type of code element, employed to signify binary zeros in the identification member 14C, is represented by code element 202 illustrated in FIG. 11. As shown therein, the front surface 259 of the blank code element 202 is a smooth surface, the contour being broken only by the mounting flanges at the opposed ends of the code element. Preferably, surface 259 is a convex surface corresponding in curvature to the external surface of the reflector code elements as exemplified by surface 223 of code element 201 (FIG. 7). This is not essential; a flat surface can be used as the surface 259 of the blank code element 202. The curved configuration is preferred to minimize surface variations in the assembled identification member and thereby reduce the tendency for collection of foreign matter on the surface of the identification member.

As pointed out in the aforementioned co-pending Patent No. 3,247,510, it is highly desirable that the apexial axes of adjacent corner reflector elements be oriented at angles of 90° relative to each other in order to achieve effective monopulse operation and to make sure that adjacent binary ones are fully distinguished from each other. This is true even if there is an intervening blank or binary zero between any two binary ones. The desired alternate angular relation can be consistently achieved by careful control in fabrication, particularly if this is done at a central point. But it is usually desirable to provide for assembly of individual code elements into identification members at several locations, multiplying the possibilities of error in this regard. In the code elements constructed in accordance with the present invention, the desired alternate mounting arrangement for the type A and type B code elements is assured by a system of interlocking lugs connecting adjacent code elements, and is best illustrated in FIG. 12.

As shown in the exploded rear elevation view of FIG. 12, code element 201 is provided on one edge 264 with a single projecting lug 261 and two-lug receiving slots 262 and 263. The opposite side edge 265 also includes a single projecting lug 266 and a pair of lug receiving slots 267 and 268. The positions of the lugs and slots on the two opposed sides 264 and 265 of code element 201 are such that, if the code element is rotated through an angle of 180° about an axis normal to the code element, the lug and slot arrangement presented at the side edges remains unchanged. Because the lug and slot positions are not symmetrical with respect to a given edge, it is not possible to mount another code element having the same lug and slot arrangement immediately adjacent to code element 201.

The type C blank code element 202, along its right-hand edge 271 as shown in FIG. 12, is provided with two projecting lugs 272 and 273 aligned with the slots 267 and 268, respectively, in the code element 201. The side edge 271 of code element 202 also has a slot 274 for receiving the lug 266 on code element 201. It is thus seen that the blank code element 202 can be fitted directly against the type A code element 201 with the side surfaces 265 and 271 of the two code elements abutting each other.

The left-hand edge 275 of the blank code element 202 is provided with two lug-receiving slots 277 and 278 and a projecting lug 276. The interlocking elements 276, 277 and 278 correspond precisely in position to the elements 266, 267 and 268, respectively, on the side edge 265 of code element 201. In assembly of the code elements illustrated in FIG. 12, the slots 277 and 278 receive two projecting lugs 282 and 283 formed on the right-hand edge 281 of the type B code element 203. The side 281 of code element 203 also has a lug-receiving slot 284 into which the lug 276 on code element 202 fits. The type B code element 203, along its left-hand edge 285, has two projecting lugs 286 and 287 and a lug-receiving slot 288. The arrangement of these interlocking elements 286–288 is the exact reverse of the elements 282–284 on the opposite edge of the code element. Thus, code element 203, if rotated 180° about an axis extending normal to the face of the code element illustrated in FIG. 12, would still present interlocking elements matching with the interlocking elements on the adjacent edge of the blank code element 202.

One additional blank code element 204 is illustrated in FIG. 12. The construction of this blank code element is identical with code element 202 but the code element 204 is illustrated with an orientation displaced 180° relative to code element 202. In this orientation, and as shown in FIG. 12, the blank code element affords interlocking elements that match precisely with the lugs 286 and 287 and the lug-receiving slot 288 on code element 203. With the illustrated interlocking construction, or any desired variation thereof, it is apparent that one of the blank code elements of type C, such as code elements 202 and 204, can always be mounted adjacent any of the type A reflector code elements (element 201) or any of the type B reflector code elements (element 203). However, it is not possible to mount two type A code elements such as code element 201 next to each other because the interlocking elements interfere with each other. This is equally true with respect to the type B code elements. They cannot be mounted immediately adjacent each other because of the interferring interlocking lugs.

If a conventional parity check is to be employed with an identification member such as member 14C (FIG. 3) conventional practice requires the addition of several "positive reflection" bits, binary ones in the system described above, so that it will always be possible to have the same total number of binary ones in each code message. This form of parity check, therefore, inevitably adds to the total length of the identification member. The identification member tends toward an ungainly length to begin with, and the additional length required for a conventional parity checking system is quite undesirable.

In the preferred form of identification member illustrated in FIG. 3, provision is made for an accurate and effective parity check without addition of separate parity spaces. This is accomplished by fabricating the individual code elements with different widths for binary zeros and binary ones. In the illustrated construction, a ratio of two to one is employed for this purpose, the binary zeros each having a width equal to one-half the width of the code elements representing binary ones.

In detecting and processing code data from the indentification member 14C, there are several possible errors that may occur. Thus, a binary one represented by a positive reflector element may be missed by the receiving equipment. A superfluous binary one may be inserted due to erroneous operation of the receiving equipment, although this is quite rare. In the processing of the data signals developed by the receiving equipment, operating on a synchronous basis, superfluous zeros may be inserted or the equipment may fail to insert the proper number of zeros; the possibility of this error is readily apparent when it is realized that zeros are represented by a failure to reflect the interrogating signal and must be inserted from a clock pulse source in the processing equipment.

With code elements of different widths for binary ones and binary zeros, and specifically with the 2:1 ratio described above and illustrated in FIG. 3, the parity check can be effected simply by checking the number of bit positions filled in a storage register upon recording of the code signal developed by the receiver portion of the scanning apparatus. If an inadequate number of zeros has been inserted by the synchronous processing equipment, then the storage register will not be filled completely and an error is indicated. Any excessive insertion of zeros will cause the message to go beyond the predetermined capacity for the register and will automatically indicate an error. A loss of any positive binary one signal will cause the message to be too long because the processing equipment will automatically insert two zeros in place of a binary one due to the width differential between the binary ones and the binary zeros on the identification member. Of course, any additional and spurious binary one developed by the receiving equipment will cause an overflow of the storage register and will indicate an error. Thus, by the simple process of establishing the width of the binary zero code elements at a small integral fraction of the width of the binary one code elements, and preferably with a ratio of 2:1 as described above, provision is made for a simple and effective parity check without adding in any way to the length of the identification member.

It will be apparent, from the foregoing description of the relationship between the widths of the code elements representing binary ones and those representing binary zeros, that the overall length of the identification member 14C, insofar as the code data portion is concerned, may vary, depending upon the total number of binary ones and binary zeros in the code message. This presents no substantial problem, however, since the effective code length is identical for each message. To meet the physical requirements of a single length base or frame 200, the frame is made big enough to accommodate a message of maximum physical length and any unused length for a physically short message is filled with blank code elements located beyond the ends of the code data portion of the message.

The code element structure incorporated in the present invention makes it possible to utilize a plurality of individual corner reflectors on a single code element without adversely affecting operation of the microwave or other radiant energy reflection system due to rotational or translational displacement of the identification member in relation to an optimum reflection position. The plural corner reflection construction increases the reflection efficiency of the identification member without materially increasing the physical size. The preferred width relation for the identification members provides a parity check without requiring separate parity positions in the code arrangement. Monopulse operation is assured, when the identification members are assembled from physically distinct code elements, by the interlocking mounting ararngement adapted for the code elements. The code elements themselves, which may be conveniently and inexpensively fabricated as castings of aluminum or other conductive material, are rugged enough for use in the most adverse kinds of environment.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. A coded identification member for use in an automatic object identifying system in which individual objects are identified at a scanning station including a source of radiant energy signals, radiating means for radiating said signals along a given reference path and polarized in a given initial direction, and receiving means for receiving such reflected radiant energy signals but limited to reception of signals polarized in a second and substantially different direction, said identification member comprising:
   an elongated base adapted to be mounted on one of the objects to be identified; and
   a plurality of code elements disposed at predetermined code positions along said base, said code elements comprising at least two distinct types as follows:
      Type A—code elements having a plurality of aligned similar corner reflectors having their apexial axes at an angle of 45° counter-clockwise relative to said initial direction of polarization and with said apexial axes on a convex surface approximately tangential to a plane normal to said reference path, and
      Type B—code elements substantially identical to the elements of type A except that the apexial axes of their corner reflectors are at an angle of 45° clockwise relative to said initial direction of polarization.

2. A coded identification member for use in an automatic object identifying system in which individual objects are identified at a scanning station including a source of radiant energy signals, radiating means for radiating said signals along a given reference path and polarized in a given initial direction, and receiving means for receiving such reflected radiant energy signals but limited to reception of signals polarized in a second and substantially different direction, said identification member comprising:
   an elongated base adapted to be mounted on one of the objects to be identified; and
   a plurality of code elements disposed at predetermined code positions along said base, said code elements comprising at least two distinct types as follows:
      Type A—code elements, representative of one binary value, each having a plurality of aligned similar corner reflectors having their apexial axes at an angle of 45° counter-clockwise relative to said initial direction of polarization and with said apexial axes on a convex surface approximately tangential to the plane normal to said reference path, and
      Type C—code elements, representative of an alternate binary value, similar to the elements of type A but each having a smooth surface facing said reference path.

3. A coded identification member for use in an automatic object identifying system in which individual objects are identified at a scanning station including a source of radiant energy signals, radiating means for radiating said signals along a given reference path and with a given initial polarization, and receiving means for receiving such reflected radiant energy signals but limited to reception of signals with a second polarization displaced 180° from said initial polarization, said identification member comprising:
   an elongated base adapted to be mounted on one of the objects to be identified; and
   a plurality of code elements disposed at predetermined code positions along said base, said code elements comprising three distinct types as follows:
      Type A—code elements having a plurality of aligned similar corner reflectors having their apexial axes at an angle of 45° in a first direction relative to said initial polarization and with said apexial axes on a convex surface approximately tangential to the plane normal to said reference path,
      Type B—code elements substantially identical to the elements of type A except that the apexial axes of their corner reflectors are at an angle of 45° in an opposite direction relative to said initial polarization, and
      Type C—code elements similar to the elements of types A and B but having a smooth surface facing said reference path.

4. A coded identification member according to claim 3, in which said code elements of types A, B and C are formed as separate physical members each provided with interlocking lug and slot means for linking the code elements to each other, said lug and slot means permitting mounting of type C code elements adjacent code elements A, B and C, permitting mounting of type A code elements adjacent code elements of types B and C, and permitting mounting of type B code elements adjacent code elements of types A and C, but preventing mounting of code elements of types A and B adjacent code elements of the same type.

5. A coded identification member according to claim 4 in which said code elements of type A each have two lug-receiving slots and a single lug along each side thereof, said code elements of type B each have two lugs and a single lug-receiving slot along each side thereof, and said code elements of type C each have two lug-receiving slots and a single lug along one side thereof and two lugs and a single lug-receiving slot along the opposite side thereof.

No references cited.

RODNEY D. BENNETT, *Acting Primary Examiner.*

CHESTER L. JUSTUS, *Examiner.*

C. E. WANDS, *Assistant Examiner.*